219-121 SR
5/10/77 XR 4,021,906

United States Patent [19] [11] 4,021,906
Takahashi [45] May 10, 1977

[54] METHOD OF MANUFACTURING AN ENDLESS PRINTING BELT FOR A BELT TYPE PRINTING APPARATUS

[75] Inventor: Soroku Takahashi, Tokyo, Japan

[73] Assignee: Kyuroku Kabushiki-Kaisha, Tokyo, Japan

[22] Filed: June 11, 1976

[21] Appl. No.: 695,011

Related U.S. Application Data

[63] Continuation of Ser. No. 596,860, July 17, 1975, abandoned.

[30] Foreign Application Priority Data

July 20, 1974 Japan ............................ 49-83666

[52] U.S. Cl. .................................. 29/407; 29/445; 101/93.13; 156/659; 156/664; 219/121 EB
[51] Int. Cl.² ........................................ B23Q 17/00
[58] Field of Search ................. 29/407, 445; 156/7, 156/18; 101/93.13; 219/121 EB, 121 EM; 228/171, 172, 144, 155

[56] References Cited

UNITED STATES PATENTS

| | | | |
|---|---|---|---|
| 1,094,299 | 4/1914 | Brown | 101/93.13 |
| 1,565,583 | 12/1925 | Moore | 156/7 X |
| 1,852,115 | 4/1932 | Haggerty et al. | 156/7 UX |
| 2,754,606 | 7/1956 | Williams | 156/7 X |
| 2,762,297 | 9/1956 | Baer | 101/93.13 |
| 2,896,312 | 7/1959 | Schell | 29/407 X |
| 3,279,050 | 10/1966 | Simich | 29/445 |
| 3,431,627 | 3/1969 | Fields | 29/407 X |
| 3,436,515 | 4/1969 | Sayer et al. | 219/121 EM |
| 3,763,544 | 10/1973 | Gibson | 29/407 |
| R17,805 | 9/1930 | Sadtler | 156/7 |

*Primary Examiner*—Charlie T. Moon

[57] ABSTRACT

A thin heat-treated steel sheet material having marginal zones formed along four edges thereof is photo-etched to produce printing types and the like which are integral with the sheet material. The reverse side thereof is also slightly photo-etched for removing and equalizing the strains on both side surfaces of the sheet. The transverse marginal zones are utilized for successive welding and trimming operations. The welding of the longitudinal edges of the sheet material for making the material into an endless form and its temper is made by subjecting said edges to primary and secondary electron beams.

4 Claims, 3 Drawing Figures

METHOD OF MANUFACTURING AN ENDLESS PRINTING BELT FOR A BELT TYPE PRINTING APPARATUS

This is a continuation of application Ser. No. 596,860, filed July 17, 1975, now abandoned.

This invention relates to a method of manufacturing an endless printing belt for a belt type printing apparatus.

Heretofore, type blocks were integrally secured by pins or the like to an endless belt for manufacture of the printing belt. With this known method, it was necessary to mount the type blocks on the belt one by one by painstaking operations, and also to provide the belt with precisely corresponding or aligning openings for type blocks and timing marks. This means a high cost and complicated operations for manufacture of the printing belt. Moreover, the printing belt is liable to break owing to the increased mass of the typing blocks.

The present invention is, therefore, to solve these defects accompanying to the known method, and to provide an improved method for manufacture of the printing belt.

In the accompanying drawing in which a preferred embodiment of the printing belt made in accordance with the present invention is illustrated:

Figure 1:
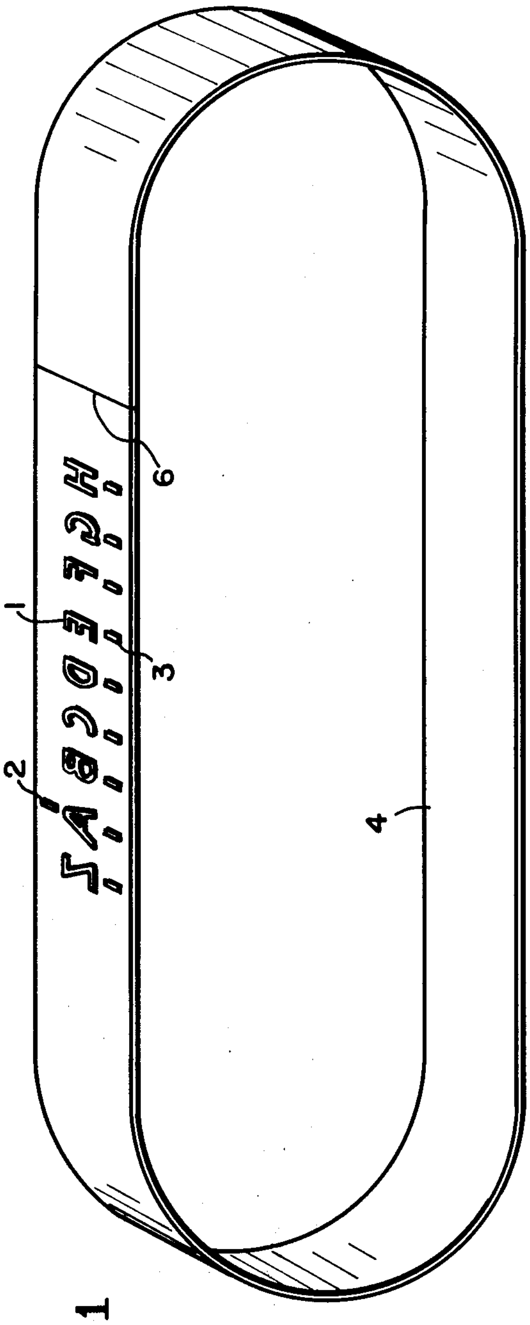
FIG. 1 is a perspective view of the complete printing belt formed into an endless form.
Figure 2:
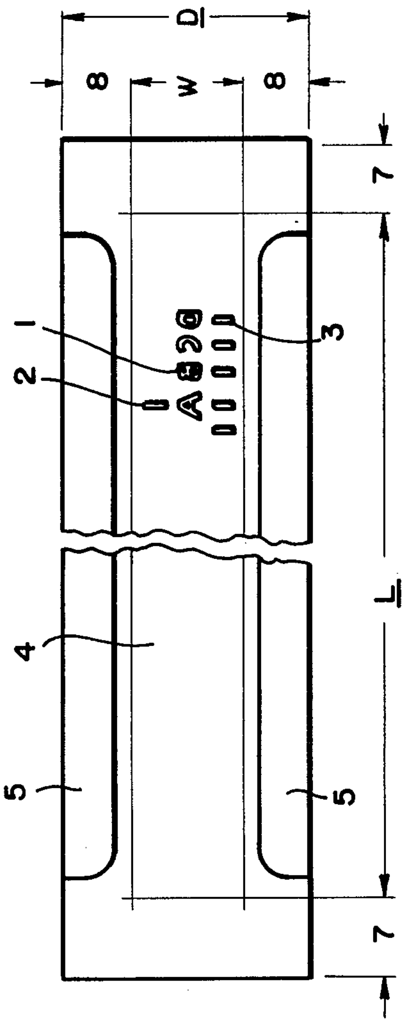
FIG. 2 is a fragmentary top plan view of a blank from which said printing belt is made, the blank being shown as it appears after having been photo-etched, and before being cut and shaped into a final endless belt form.
Figure 3:
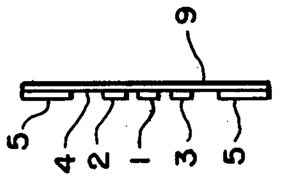
FIG. 3 is an end view of the blank illustrated in FIG. 2.

In the drawing, numeral 1 represents printing types, 2 timing marks, 3 sprockets, 4 a belt member or an elongated metallic sheet, 5 a non-etched zone or clearance, 6 a seam formed by the joined parts, 7 a longitudinal marginal end portion, and 8 a transverse marginal side portion. The letter L represents a final longitudinal length of the belt 4 when it is formed into an endless belt, and the letter W the width of said complete endless belt, and D the width of the blank.

An example of the present invention is described hereinunder, in which a coil or hoop material of martensite stainless steel produced in a vacuum melting furnance was employed. The material has a nominal composition (C: 0.35%, Mn: 0.3%, Cr: 13.5% Mo: 1.3% and Fe: the balance). The material had a hardness of mHv 400–600 and a thickness of 0.4 mm. Said material was slit into elongated narrow strips each being of a width D equal to the width W if the final printing belt, and including the transverse marginal side portions 8 of 30 mm. The strips were then cut into sheets each including the longitudinal section L plus the longitudinal marginal end portions 7 of 30 mm in total. Then, the printing belt member 4, consisting of one of said sheets, was subjected to photo-etching for the formation of printing types 1, timing marks 2, sprockets 3 and non-etched zones 5, positioned so that the longitudinal end margins 7 and transverse side margins 8 of equal sizes were distributed along the four edges of the belt material. At this time the thickness of the belt material 4 was controlled to be equal to 0.14 mm. The reverse side 9 of the belt material was also etched within the range of 0.01 mm. The belt material 4 thus treated was heated for two hours at the temperature of about 200° C.

The non-etched areas 5 were perforated with reference openings which were used for the grinding and joining operations, as described hereinafter. Then, the longitudinal end portions 7 were cut off and the end faces were ground flat and smooth, viz., to within 1.5 S.

The belt material was then subjected to de-magnetizing and de-greasing operations, and the ends of the belt were secured temporarily to each other by means of the aforementioned reference openings in sections 5. The belt, thus secured into an endless form with its surface with the types 1 facing outwardly, was mounted on a vacuum chamber type electron beam welder. The ends of the band were butt-welded to each other by the electron beam, 250 Hz, which was focused with a size of 0.2 mm in diameter. The filament current was then lowered in its density and the electron beam of a lower energy density having a somewhat divergent spot was passed again through the welding zone 6 so that the welding stress or camber could be removed and the hardness distribution of the welded zone would be included in the range of mHv 400–600. In carrying out the two consecutive electron beam scanning operations, it is essential to fully grasp the values of accelerating voltage, filament current and focus. The transverse side edge portions 8 were then removed by grinding by using the reference openings and finished to be within the desired dimensional tolerance. The printing types were subjected at their faces to hard chromeplating or titanium carbide coating to increase their wear resistance.

The printing belt obtained in this way in accordance with the present invention has the printing types and timing marks integrally formed thereon and is formed from the strip of quenched stainless steel material which is joined at the two ends into an endless form with electron beam welding. It should be noted that after welding, the belt material is processed with a secondary electron beam for removal of the welding stress or camber. In this way, a printing belt of high strength and accuracy may be manufactured at a lower cost.

In the present invention, structural alloy steel, tool steel, spring steel and bearing steel which have the property of becoming hardened on quenching can be used advantageously as the starting belt sheet material.

While this invention has been described in connection with only a single embodiment thereof, it is apparent that it is capable of further modification, and this application is intended to cover any such modifications which fall within the scope of one skilled in the art or the appended claims.

What I claim:

1. A method of manufacturing an endless printing belt for belt type printing apparatus, which comprises the steps of forming on one side of a thin heat-treated steel sheet material, with marginal zones formed along the four sides thereof, printing types, timing marks, sprockets and non-etched zones by a photo-etching process, said non-etched zones being located in the transverse marginal zones, subjecting the reverse side surface of the sheet material to a slight degree of photoetching, heating the sheet material, perforating the non-etched zones with reference openings to be used for welding and trimming operations, removing the longitudinal end portions of the sheet, grinding the end edges of the sheet, securing the end edges together with the type surfaces facing outwardly, welding the secured edges of the sheet material, by using an electron beam focused into a circular spot, applying to the welded zone an additional electron beam of lower energy density after completion of the welding with decreased filament current and diverged spot of the beam, removing the transverse edge portions of the sheet by grinding, and finishing the type faces.

2. A method as claimed in claim 1, in which the steel sheet material is a heat-treated martensite stainless steel.

3. A method as claimed in claim 2, in which the heating of the sheet material after photo-etching is conducted at a temperature of about 200° C for about 2 hours.

4. A method of manufacturing an endless printing belt for belt type printing apparatus, which comprises the steps of forming on one side of a thin heat-treated steel sheet material, with marginal zones formed along the four sides thereof, printing types, timing marks, sprockets and non-etched zones by a photo-etching process, said non-etched zones being located in the transverse marginal zones, subjecting the reverse side surface of the sheet material to a slight degree of photoetching, heating the sheet material, perforating the non-etched zones with reference openings to be used for welding and trimming operations, removing the longitudinal end portions of the sheet, grinding the end edges of the sheet, securing the end edges together with the type surfaces facing outwardly, welding the secured edges of the sheet material, annealing the welded zone after completion of the welding, removing the transverse edge portions of the sheet, and finishing the type faces.

* * * * *